United States Patent
Hoopengarner

(10) Patent No.: US 12,409,779 B2
(45) Date of Patent: Sep. 9, 2025

(54) INVERTER PHASES AND PARAMETERS AS OSCILLATOR IN VEHICLE SOUND GENERATOR

(71) Applicant: BorgWarner US Technologies LLC, Wilmington, DE (US)

(72) Inventor: Eli David Hoopengarner, Avon, IN (US)

(73) Assignee: BORGWARNER US TECHNOLOGIES LLC, Wilmington, DE (US)

(*) Notice: Subject to any disclaimer, the term of this patent is extended or adjusted under 35 U.S.C. 154(b) by 152 days.

(21) Appl. No.: 18/074,442

(22) Filed: Dec. 2, 2022

(65) Prior Publication Data
US 2024/0181963 A1    Jun. 6, 2024

(51) Int. Cl.
- *B60Q 5/00* (2006.01)
- *B60L 3/12* (2006.01)
- *G10K 15/02* (2006.01)

(52) U.S. Cl.
CPC .............. *B60Q 5/008* (2013.01); *B60L 3/12* (2013.01); *G10K 15/02* (2013.01); *B60L 2270/42* (2013.01); *B60Y 2306/11* (2013.01)

(58) Field of Classification Search
CPC ....... B60Q 5/008; B60L 3/12; B60L 2270/42; G10K 15/02; B60Y 2306/11
See application file for complete search history.

(56) References Cited

U.S. PATENT DOCUMENTS

| | | | |
|---|---|---|---|
| 4,771,390 A * | 9/1988 | Dolph | G10L 13/00 704/274 |
| 5,635,903 A | 6/1997 | Koike et al. | |
| 2010/0123778 A1 | 5/2010 | Hada | |
| 2011/0261970 A1 | 10/2011 | Hamelink et al. | |
| 2017/0217331 A1 * | 8/2017 | Valeri | B60Q 5/008 |
| 2017/0259695 A1 | 9/2017 | Ishikawa et al. | |
| 2018/0043789 A1 | 2/2018 | Goetz | |
| 2020/0403555 A1 * | 12/2020 | Mills | H02S 10/30 |
| 2022/0080853 A1 | 3/2022 | Goldfarb et al. | |

FOREIGN PATENT DOCUMENTS

| | | | | |
|---|---|---|---|---|
| GB | 2509132 A | | 6/2014 | |
| JP | 2004023810 A | * | 1/2004 | |
| JP | 2012016039 A | * | 1/2012 | ............... H03G 3/32 |
| JP | 2013189022 A | | 9/2013 | |
| WO | WO-2020195280 A1 | * | 10/2020 | ............. B60Q 5/008 |

OTHER PUBLICATIONS

International Search Report and Written Opinion for International Application No. PCT/US2023/082083 mailed Mar. 18, 2024.

* cited by examiner

*Primary Examiner* — Rufus C Point
(74) *Attorney, Agent, or Firm* — Dickinson Wright PLLC

(57) ABSTRACT

A sound synthesis system and method are provided for an electric or hybrid electric vehicle. The system receives an audio signal from an inverter of the vehicle comprising an analog waveform, a digital waveform, or a parameter. The audio signal from the inverter is synthesized and combined with another audio signal via at least one of combination, superimposition, mixing, multiplication, and adding, and the combined signal is amplified and output as a synthesized audio signal or as a visual display of a waveform of the amplified, combined signal.

16 Claims, 6 Drawing Sheets

Inverter Signal as Primary Waveform in Sound Oscillator Synthesis
(Inverter Signal in Red)

*Example Inverter Signal and/or Waveform Created with Influence from Inverter Parameters*

+

Example Synthesized Waveform

+ n Other Synthesized Waveforms (not exclusive to sawtooth as depicted)

---

Example Resultant Oscillator for Sound Generator

Inverter Signal as Complimentary Waveform in Sound Oscillator Synthesis
(Inverter Signal(s) in Red)

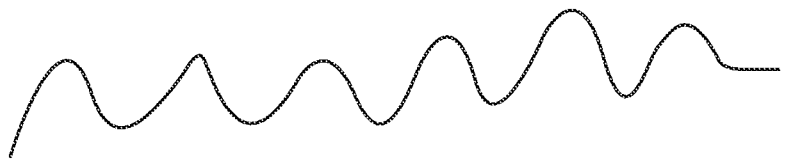

Example Synthesized Waveform

+

*Example Inverter Signal*

+

*n Other Inverter Signals (not exclusive to PWM depicted) and/or Waveforms Created with Influence from Inverter Parameters*

+

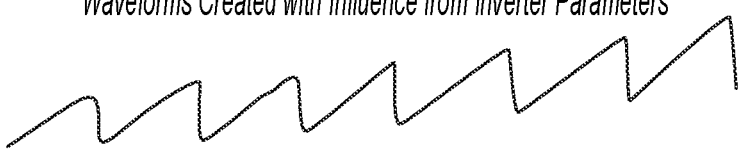

n Other Synthesized Waveforms (not exclusive to sawtooth as depicted)

---

Example Resultant Oscillator for Sound Generator

FIG. 6

INVERTER PHASES AND PARAMETERS AS OSCILLATOR IN VEHICLE SOUND GENERATOR

TECHNICAL FIELD

Apparatuses and methods consistent with example embodiments relate to a sound synthesis system for an electric or hybrid electric vehicle.

BACKGROUND

Vehicles, such as cars, trucks, sport utility vehicles, crossovers, mini-vans, and other vehicles, include a powertrain system that includes, for example, a propulsion unit, a transmission, drive shafts, wheels, and other suitable components. The propulsion unit may include one or more of an internal combustion engine, a fuel cell, and an electric motor. A hybrid vehicle may include a powertrain system including more than one propulsion unit. For example, a hybrid vehicle may include both an internal combustion engine and an electric motor that operate cooperatively to propel the vehicle.

In an electric-powered vehicle, such as a hybrid vehicle or a purely electric vehicle, the electronics incorporate a high voltage (HV) battery, often referred to as a rechargeable energy storage system (RESS), as well as other electronic devices and components such as inverters, direct current (DC)/DC converters, and on-board chargers (OBCs) to manage energy output and regeneration within the vehicle.

The Pedestrian Safety Act went into effect in September of 2019. However, even earlier than this, many electric and hybrid vehicles used a source of artificial sound to warn pedestrians when the vehicle is traveling under 19 miles per hour, as at any speed below this, the tires of the vehicle do not make enough road noise to be a sufficient method of warning pedestrians of an oncoming vehicle.

Some vehicles base this "artificial" sound on various sensors on the vehicle, such as a rotational speed sensor. The speed is determined based on the sensor, and a sound is generated based on the speed of the vehicle.

There are many other sources of this artificial warning sound deployed by various automakers, but most involve playing a warning sound on a loudspeaker. Other methods utilize an inverter to create a sound-producing waveform that is then send to one or more phases of an electric motor. This creates an electromechanical sound audible to a pedestrian.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, a sound synthesis method may comprise: receiving at least one of an analog waveform, a digital waveform, and a parameter, from an inverter of a vehicle; synthesizing a first audio signal based on the at least one of the analog waveform, the digital waveform, and the parameter; generating a combined signal based on the first audio signal and a second audio signal using at least one of a combination function, a superimposition function, a mixing function, a multiplication function, and an adding function; generating an amplified combined signal by amplifying the combined signal; and outputting the amplified combined signal.

At least one of the first audio signal and the second audio signal may be associated with a temperature sensor disposed within the vehicle.

The temperature sensor may be configured to measure a temperature of at least one of: an alternating current bus bar of the inverter, a direct current bus bar of the inverter, a printed circuit board of the inverter, a location along a coolant path of the vehicle, an insulated gate bipolar transistor (IGBT) of the inverter, a metal-oxide semiconductor field-effect transistor (MOSFET) of the inverter, and one or more end windings of an electric motor of the vehicle.

At least one of the first audio signal and the second audio signal may comprise a signal associated with a rotational speed sensor signal within the inverter.

The rotational speed sensor signal may comprise at least one of a resolver excitation signal, a resolver sine signal, a resolver cosine signal, and a rotary encoder signal.

At least one of the first audio signal and the second audio signal may comprise a signal associated with a motor control parameter.

The motor control parameter may represent at least one of: a current command, a torque command, a voltage command, a feedback of current, a feedback of voltage, a measurement of torque, a selected pulse width modulation (PWM) strategy, a PWM frequency, a PWM duty cycle, an electric machine parameter of flux linkage, and an electric machine parameter of inductance.

At least one of the first audio signal and the second audio signal may comprise a signal associated with a current sensor within the vehicle.

At least one of the first audio signal and the second audio signal may comprise a signal associated with one of a phase current, a direct current (DC) bus current, a collector to emitter current of a transistor of the inverter, a drain to source current of a transistor of the inverter, and an inductor current of a DC/DC converter.

At least one of the first audio signal and the second audio signal may comprise a signal associated with a voltage sensor within the vehicle.

At least one of the first audio signal and the second audio signal may comprise a signal associated with one of a phase voltage and a direct current bus voltage.

The outputting the combined signal may comprise outputting, using at least one speaker, an audio signal corresponding to the amplified combined signal.

The outputting the combined signal may comprise outputting, using a display, a visual representation of the combined signal.

According to an aspect of another example embodiment, a sound synthesis system may comprise: an input configured to receive at least one of an analog waveform and a digital waveform from an inverter of a vehicle; a synthesizer operatively connected to the first input and configured to synthesize a first audio signal based on the at least one of the analog waveform and the digital waveform; a combination module operatively connected to the synthesizer and configured to generate a combined signal based on the first audio signal and a second audio signal using at least one of a combination function, a superimposition function, a mixing function, a multiplication function, and an adding function; an audio amplifier operatively connected to the combination module and configured to generate an amplified combined signal by amplifying the combined signal; and an output module configured to output the amplified combined signal.

According to an aspect of another example embodiment, a vehicle may comprise: an electric motor; an inverter; and a sound synthesis system comprising: an input operatively connected to the inverter and configured to receive at least one of an analog waveform and a digital waveform from the inverter; a synthesizer operatively connected to the first input and configured to synthesize the first audio signal based on the at least one of the analog waveform and the digital waveform; a combination module operatively connected to the synthesizer and configured to generate a combined signal based on the first audio signal and a second audio signal using at least one of a combination function, a superimposition function, a mixing function, a multiplication function, and an adding function; an audio amplifier operatively connected to the combination module and configured to generate an amplified combined signal by amplifying the combined signal; and an output module configured to output the amplified combined signal.

According to an aspect of another example embodiment, a non-transitory computer-readable medium may be provided, storing thereon executable instructions that, when executed by a processor, facilitate performance of a method comprising: receiving at least one of an analog waveform and a digital waveform from an inverter of a vehicle; synthesizing a first audio signal based on the at least one of the analog waveform and the digital waveform; generating a combined signal based on the first audio signal and a second audio signal using at least one of a combination function, a superimposition function, a mixing function, a multiplication function, and an adding function; generating an amplified combined signal by amplifying the combined signal; and outputting the amplified combined signal.

BRIEF DESCRIPTION OF THE DRAWINGS

The above and/or other aspects will become apparent and more readily appreciated from the following description of example embodiments, taken in conjunction with the accompanying drawings.

FIG. 6 generally illustrates an inverter signal or waveform as a complementary waveform of the oscillator, according to example principles of the present disclosure.

DETAILED DESCRIPTION

Figure 1:
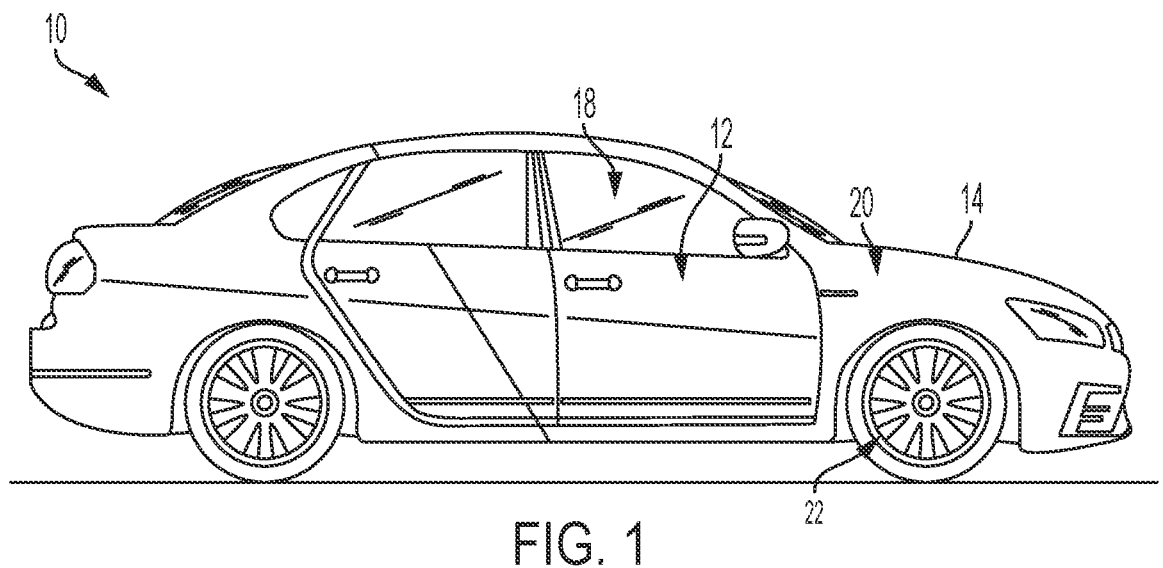
FIG. 1 generally illustrates an example vehicle according to example principles of the present disclosure.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including," "comprise," and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

According to one or more example embodiments, the problem of pedestrian safety can artificial sourcing of sound may be addressed, at least in part, by the amplification, modulation, distortion, clipping, or application of another signal-altering method to a single signal or a plurality of signals internal to the inverter; the superimposition or mixing of a single signal or plurality of internal signals with an internal or external signal or waveform; the derivation of a signal influenced by a signal, logic output, or parameter internal to the inverter; or a combination of these methods in order to create an audible sound for a pedestrian warning system, a vehicle interior sound system, a combustion engine exhaust booster, or another source of artificial sound associated with a vehicle.

FIG. 1 illustrates an example vehicle 10. The vehicle 10 may be any vehicle, such as a car, a truck, a sport utility vehicle, a mini-van, a crossover, any other passenger vehicle, any commercial vehicle, or any other vehicle. While the vehicle 10 is illustrated as a passenger vehicle having wheels and for use on roads, the principles of example embodiments described herein may apply to other vehicles, such as motorcycles, planes, boats, trains, drones, or other vehicles, as would be understood by one of skill in the art. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 may provide access to the engine compartment 20 when the hood 14 is in a first or open position and may cover the engine compartment 20 when in a second or closed position.

The passenger compartment 18 may be disposed rearward of the engine compartment 20, as shown, though this is variable. The vehicle 10 may include any suitable propulsion system including, but not limited to: an internal combustion engine; one or more electric motors; one or more fuel cells; and a hybrid propulsion system comprising a combination of one or more internal combustion engines and one or more electric motors. According to one or more example embodiments, the vehicle 10 may include a petrol or gasoline fuel engine, such as a spark ignition engine. Alternately or additionally, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be connected, either directly or via other components, to corresponding components of the propulsion system, such as a throttle, a brake, a vehicle axle, a vehicle transmission, and the like. The propulsion controls may communicate signals to a vehicle computer (e.g., drive by wire) which in turn may control the corresponding propulsion components of the propulsion system.

According to one or more example embodiments, the vehicle 10 may include a transmission in operable communication with a crankshaft via a flywheel, a clutch, a fluid coupling or another means. The transmission may be a manual transmission or an automatic transmission. The vehicle 10 may include one or more pistons, in the case of an internal combustion engine or a hybrid vehicle, which cooperatively operate with the crankshaft to generate force, which is translated through the transmission to one or more axles, which turn the wheels 22.

When the vehicle 10 includes an electric motor, at least one battery or fuel cell provide energy to the electric motor to turn the wheels 22. In a case in which the vehicle 10 includes a battery to provide energy to an electric motor, when the battery is depleted, it may be connected to an electric grid (e.g., using a wall socket) to recharge the battery cells. Additionally, or alternatively, the vehicle 10 may employ regenerative braking which uses an electric motor of the vehicle 10 as a generator to convert kinetic energy lost to deceleration back into stored energy in the battery.

The vehicle 10 may include additional or fewer features than those generally illustrated or described herein.

According to one or more example embodiments, the inverter of a vehicle may be used like one might use a musical instrument. Any waveform that can be extracted from the inverter may be used in conjunction with as amplification, distortion, or any other signal-altering methods. Additionally, or alternatively, one or more waveforms internal to other vehicle systems may be utilized. Application of an "artificial" sound based on these waveforms and methods is not limited to pedestrian warning devices, and may be used in another way as an internal or external sound.

Figure 2:
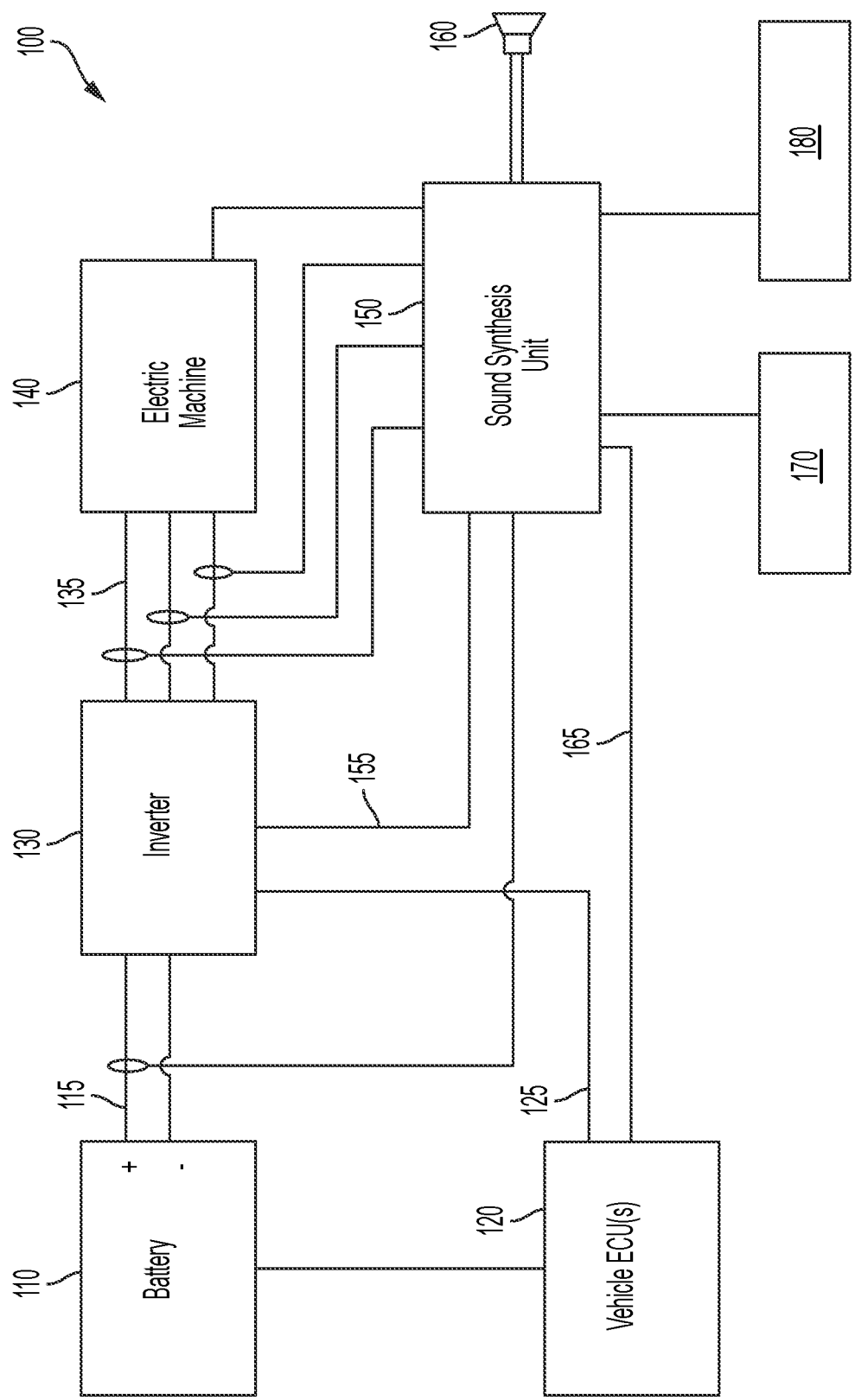
FIG. 2 generally illustrates a diagram of a sound generator system according to example principles of the present disclosure.

FIG. 2 generally illustrates a diagram of a sound generator system 100 according to example principles of the present disclosure. The system 100 includes a battery 110, an electronic control unit (ECU) 120, an inverter 130, an electric machine 140, a sound synthesis unit 150, and a speaker 160. An AC connection 135 is provided between the inverter 130 and the electric machine 140, and a DC connection 115 is provided between the battery 110 and the inverter 130. A bi-directional communication bus 125 is provided between the ECU 120 and the inverter 130. Another bi-directional bus or other interface 155 is provided between the inverter 130 and the sound synthesis unit 150. A communication bus 165, carrying commands and bi-directional data is provided between the ECU 120 and the sound synthesis unit 150. The system 100 may additionally include a current sensor 170 and/or a voltage sensor 180, operatively coupled to the sound synthesis unit 150. The current sensor may be positioned and connected within the vehicle to measure the current of at least one of a phase current, a direct current (DC)/bus current, a collector to emitter current of a transistor of the inverter, a drain to source current of a transistor of the inverter, and an inductor current of a DC/DC converter. The voltage sensor may be positioned and connected within the vehicle to measure at least one of a phase voltage and a direct current bus voltage.

Figure 3:
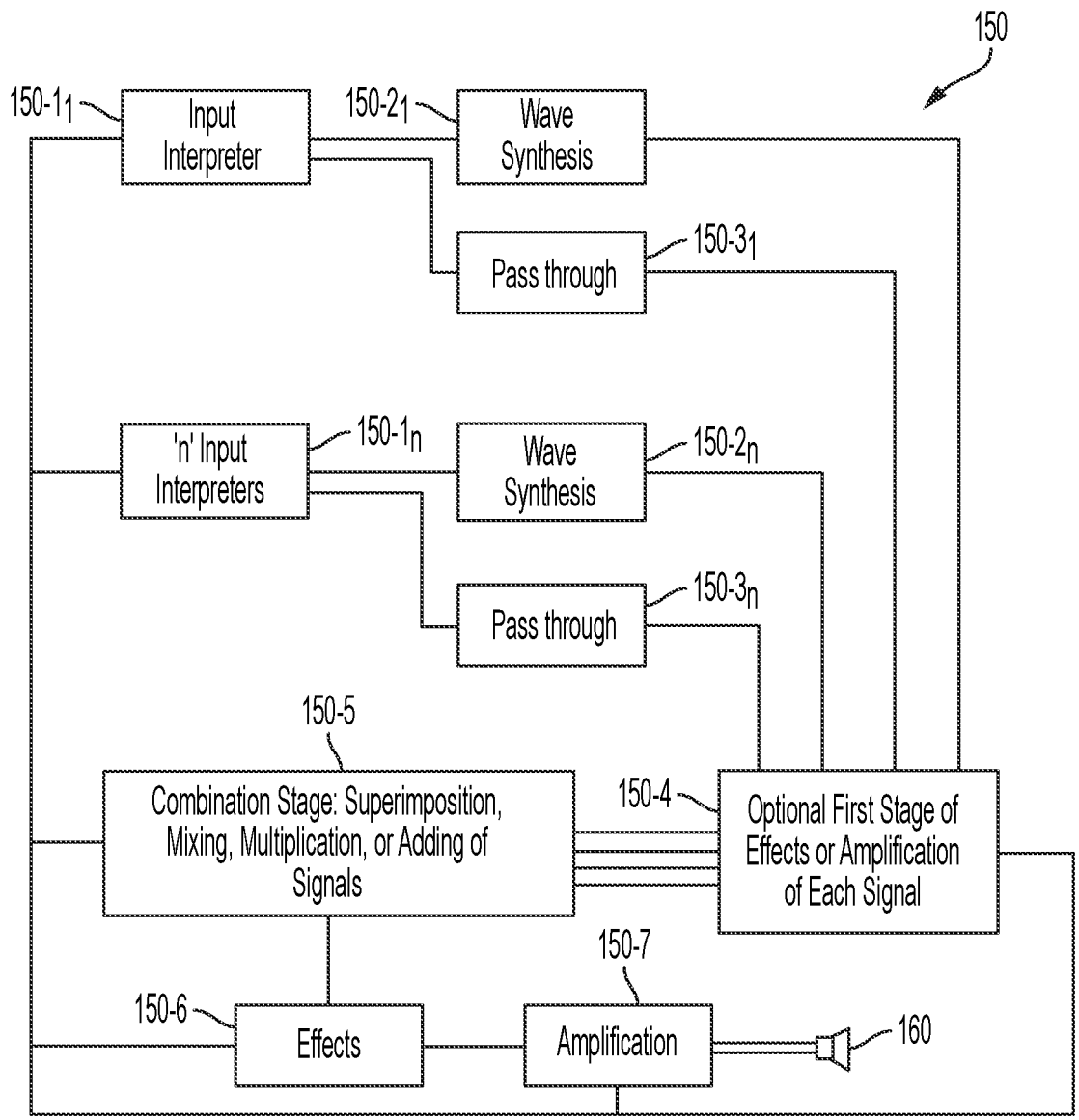
FIG. 3 generally illustrates a diagram of a sound synthesis unit 150 according to example principles of the present disclosure.

FIG. 3 generally illustrates a diagram of a sound synthesis unit 150 according to example principles of the present disclosure. The sound synthesis unit 150 includes input interpreters 150-1$_1$ through 150-1$_n$ which receive signals transmitted to the sound synthesis unit 150. The input interpreters 150-1$_{1-n}$ communicate with wave synthesis units 150-2$_{1-n}$ which synthesize signals based on signals respectively received from the interpreters 150-1$_{1-n}$. For example, the wave synthesis unit 150-2$_1$ may create a sawtooth wave when the AC bus bar temperature reaches a temperature of 30 degrees Celsius or when a current of 300 AMPs root mean square (RMS) is detected on a specific phase. Meanwhile pass through units 150-3$_{1-n}$ may each receive, and pass-through, a digital or analog representation of a signal respectively received from an input interpreter 150-1$_{1-n}$. A first stage effects/amplification unit 150-4 receives the outputs of the wave synthesis units 150-2$_{1-n}$ and the pass-through units 150-3$_{1-n}$ and provides a first stage of amplification and/or adding effects to the signals received from the wave synthesis units 150-2$_{1-n}$. A combination stage 150-5 receives the outputs of the first stage unit and combines the received signals via one or more of superimposition, multiplication, or addition, and outputs the resultant combined signal to the final effects unit 150-6 which may add effects to the combined signal. Finally, the amplifier 150-7 amplifies the signal output from the final effects unit, and outputs the final, amplified signal to the speaker 160.

Figure 4:
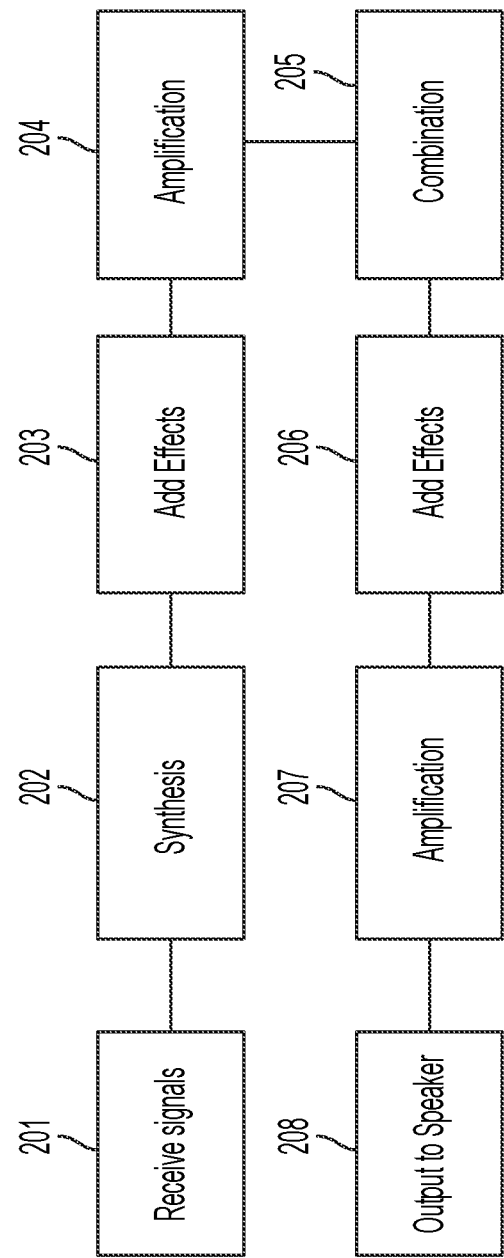
FIG. 4 generally illustrates a flow diagram, according to example principles of the present disclosure FIG. 5 generally illustrates an inverter signal or waveform inspired by a parameter internal to the inverter as the primary waveform of the oscillator, according to example principles of the present disclosure.

FIG. 4 generally illustrates a flow diagram, according to example principles of the present disclosure. As shown in FIG. 4, one or more signals are received from the inverter (201), the individually-received signals may be synthesized (202), one or more effects may be added to the received signals (203), and the received signals may be amplified (204). The received signals are combined via one or more of superimposition, multiplication, or addition (205); effects may be applied to the combined signal (206); the combined signal may be amplified (207); and the amplified, combined signal is output to the speaker (208).

The signals received from the inverter at 201 may be sourced from current sensors at any connection within the inverter or external to the inverter, such as a three-phase connection, or may be provided by any source of pulse width modulation (PWM), such as a microcontroller, a gate driver, or any other PWM generating or pass-through device, an interpreter based on another signal, logic output, or parameter internal to the inverter, or any signal internal to the inverter.

According to an example method, the obtained one or more signals may be allowed to function as a dynamically-changing primary or complimentary oscillator in the synthesis of a sound generator sound. When the signal is the primary oscillator, other signals may be mixed or superimposed with it at 202 in order to achieve a certain sound desired by the user or manufacturer. When the signal serves as a complimentary oscillator, it is then what is mixed or superimposed with other signals synthesized by the user or manufacturer. Thus, the result is an amplifiable signal, or, in other words, a future sound source that dynamically changes based on events within the inverter. Events such as acceleration and deceleration, increasing and decreasing voltages and/or currents, monitored changes in motor control parameters and strategies, and changes in modulation schemes, or temperature, would all provide authentic changes in the pitch, volume, and other audible attributes based on real-time changes in inverter signals and parameters.

Temperature sensors may be located at any of a variety of locations including, but not limited to on an alternating current (AC) bus bar, on a direct current (DC) bus bar or other DC link, on any printed circuit board (PCB) within the inverter, on an inlet and/or outlet of a coolant or at another location along a coolant path, a position configured to sense the die temperature of an insulated gate bipolar transistor (IGBT), a position to measure temperatures of leads of a metal-oxide-semiconductor field-effect transistor (MOSFET), and at end windings on an electric motor.

There are a variety of motor control parameters which, individually or in combination, may be obtained and which may function as a dynamically-changing primary or complimentary oscillator in the synthesis of a sound generator sound including, but not limited to a current commanded by the inverter, a torque commanded by the inverter, a voltage commanded by the inverter, a feedback of current, a feedback of voltage, a measurement of torque, a selected PWM strategy, a PWM frequency, a selected PWM duty cycle, an electric machine parameter of flux linkage, and an electric machine parameter of inductance. Likewise, any one or more of these parameters may be used to modify a primary or complimentary signal.

Any of a variety of signals may be used as a primary or complimentary oscillator. According to one example aspect, an AC current signal may be utilized. A signal may be obtained straight from the source—for example by a phase AC current sensor—or a digital representation of the phase current may be used to recreate a sound. The phase current (s)—either an analog or digital representation thereof—may also be used to inspire or otherwise influence the creation of a new bespoke waveform to then be added to the sound generator's oscillator. According to another example aspect, a PWM signal may be utilized. A waveform can be scaled and superimposed onto another waveform. A PWM signal may also be utilized in another system to drive the gate of a switching device, either high or low power semiconductor devices, generating pulse currents of equal or lesser magnitude, to then be detected by a current sensor and used in the sound generator. According to another example aspect, the amplitude modulated sine signal or cosine signal from a resolver on the vehicle may be rectified, put through a low pass filter, and/or passed directly to the sound generator in order to be implemented within the sound generator's oscillator. According to another example aspect, currents or voltages within a flyback transformer's primary or secondary windings, or a superimposition of the two, may be used, and so may the current or voltage across an inductor of any other DC/DC converter topology. Analog or digital representation of these currents or voltages may be used in a sound generator to inspire or otherwise influence the creation of a new bespoke waveform. According to another example aspect, drain/emitter to source/collector, gate/base to source/collector, or gate/base to drain/emitter voltage or current measurements may be used. Again, an analog or digital representation of these voltages or currents may be used in a sound generator to inspire or otherwise influence the creation of a new, bespoke waveform. Amplitude, frequency, shape, effects, or other characteristics of a signal may be inspired by a read temperature value from any component of the inverter, a measured current or voltage sensor value, or a motor control parameter. For example, if an AC bus bar reaches a temperature of 30 degrees Celsius or a current of 300 AMPs root mean square (RMS) is commanded by the motor control software of the inverter, the frequency of a harmonic or waveform used by the sound generator to create a sound may be increased.

At $1_1$, the signal, like the voltage-controlled oscillator (VCO) in a synthesizer, is either a single signal or a combination (by superimposition, mixing, or both) of multiple signals sourced from the inverter 4, 5, 8, or one or more external signal generators. The signal is then routed into a generic block 12 for effects and extra modulation, which encompasses all methods of altering the sound before it is sent to the speakers 13. Such alterations may include amplification, modulation, distortion, clipping, balancing, feedback, and/or any other type of effect that alters the final signal to be sent to the speakers 13 that make up the vehicle sound generator.

Figure 5:
Figure 5:
Figure 5:
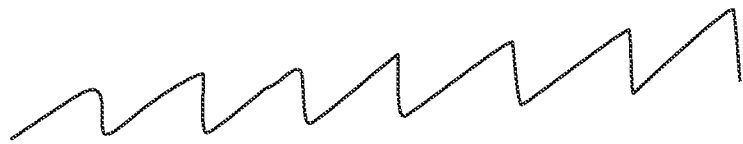
Figure 5:

FIG. 5 generally illustrates an inverter signal or waveform inspired by a parameter internal to the inverter as the primary waveform of the oscillator, according to example principles of the present disclosure. In this example, the inverter signal or waveform inspired by a parameter internal to the inverter may function as the only waveform in the oscillator or as the foundation of a synthesized waveform used as the oscillator.

FIG. 6 generally illustrates an inverter signal or waveform as a complementary waveform of the oscillator, according to example principles of the present disclosure. In this example, the primary waveform is a synthesized waveform, or another signal or waveform which may be related to or not related to the inverter.

According to one or more example embodiments, there are multiple ways to superimpose signals, from the signal itself or from a digital representation of the signal, and using any number of phases.

Existing sensors within the vehicle may be used, or new sensors may be added. For example, a drain to source measurement creates an interesting waveform that can be used. This may be measured in a lab or a new sensor may be added. Alternately, or in addition, a flyback transformer on the primary and secondary windings has a current ramp which is outside of the audible range but may be used as well.

One or more example embodiments allow for an original equipment manufacturer (OEM) to use authentic vehicle parameters to influence the various synthesized sounds on a vehicle, therefrom enabling the OEM to differentiate their products from other road-going vehicles with electrified or hybrid powertrains. OEMs would also be able to market their vehicles and sound generators as creating an authentic sound since it is derived from actual signals and parameters within the inverter.

According to another example embodiment, an interface may be disposed on or functionally connected to the inverter and may display a digital or analog representation of the phase current(s) of the inverter. Such an interface may be used for end-of-line testing or calibration or for use within the vehicle sound generator or other sound synthesis device. Such an interface may display PWM signals, digital or analog representation(s) of critical internal temperatures, such as that of the AC bus bar(s), the DC bus bar(s), coolant inlet(s) and outlet(s), coolant temperature in another location, die(s) and/or lead(s) of a power switching device, such as an IGBT or MOSFET, or the end winding of an electric motor, for use in end-of-line testing or calibration or for use within the vehicle sound generator or other sound synthesis device.

According to another example embodiment, an inverter may include a sound generator there within, having an amplifiable or pre-amplified output available for interface with a speaker, sound effects device, or other peripheral that would use sound as an input. According to another example aspect, analog or digital phase current information may be sent through a vehicle harness or interfacing point, to be sent to an interpreting device such as a microcontroller, analog device, or other device which can capture a signal to be used elsewhere. The waveform may ultimately be used as the primary or complementary oscillator in a sound generator or as a reference in the synthesis of another waveform. For example, the frequency of a phase current may be used to create a sawtooth of equal frequency or the waveform may be used to add an extra harmonic into the sound generator when a certain amplitude of the phase current is detected.

According to one or more example embodiments, a controller may perform methods described herein. However, these methods are not meant to be limiting, and any type of software executed on a controller can perform one or more methods described herein. For example, any suitable controller, such as a processor executing software within a computing device onboard the vehicle 10, can perform one or more methods described herein.

In some embodiments, a non-transitory computer-readable storage medium includes executable instructions that, when executed by a processor, facilitate performance of operations, including, but not limited to, example methods described herein.

Implementations of the systems, algorithms, methods, instructions, etc., described herein can be realized in hardware, software, or any combination thereof. The hardware may include, but is not limited to, for example: computers, intellectual property (IP) cores, application-specific integrated circuits (ASICs), programmable logic arrays, optical processors, programmable logic controllers, microcode, microcontrollers, servers, microprocessors, and digital signal processors. As used herein, the term "processor" should be understood as encompassing any of the foregoing hardware, either singly or in combination. Furthermore, as used herein, the terms "signal" and "data" are interchangeable.

As used herein, the term "module" may additionally include one or more of: a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. A module may also include a memory that stores instructions executable by a controller to implement a feature of the module.

According to one or more example embodiments, systems described herein may be implemented using a general-purpose computer or general-purpose processor with a computer program that, when executed, carries out any of the methods, algorithms, and/or instructions described herein. In addition, or alternately, a special purpose computer/processor can be utilized which may contain other hardware for carrying out any of the methods, algorithms, and/or instructions described herein.

According to one or more example embodiments, all, or a portion of implementations described herein may take the form of a computer program product accessible from, for example, a computer-usable or computer-readable medium. A computer-usable or computer-readable medium mat be any device that, for example, tangibly contains, stores, communicates, or transports a program for use by or in connection with any processor. The medium may be, for example, an electronic, magnetic, optical, electromagnetic, or semiconductor device. Other suitable tangible mediums are also available.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A sound synthesis method comprising:
receiving a dynamic inverter signal from an inverter coupled between a battery and a direct current electric machine of a vehicle, wherein the dynamic inverter signal is dependent on at least one of a parameter of the inverter and an operation of the inverter;
synthesizing a first audio signal based on the dynamic inverter signal;
generating a combined signal based on the first audio signal and a second audio signal using at least one of a combination function, a superimposition function, a mixing function, a multiplication function, and an adding function;
generating an amplified combined signal by amplifying the combined signal; and
outputting the amplified combined signal, wherein at least one of the first audio signal and the second audio signal is associated with a temperature sensor disposed within the vehicle, and wherein the temperature sensor is configured to measure a temperature of at least one of: an alternating current bus bar of the inverter, a direct current bus bar of the inverter, a printed circuit board of the inverter, a location along a coolant path of the vehicle, an insulated gate bipolar transistor (IGBT) of the inverter, a metal-oxide semiconductor field-effect transistor (MOSFET) of the inverter, and one or more end windings of an electric motor of the vehicle.

2. The method according to claim 1, wherein at least one of the first audio signal and the second audio signal comprises a signal associated with a motor control parameter.

3. The method according to claim 2, wherein the motor control parameter represents at least one of: a current command, a torque command, a voltage command, a feedback of current, a feedback of voltage, a measurement of torque, a selected pulse width modulation (PWM) strategy, a PWM frequency, a PWM duty cycle, an electric machine parameter of flux linkage, and an electric machine parameter of inductance.

4. The method according to claim 1, wherein at least one of the first audio signal and the second audio signal comprises a signal associated with a current sensor within the vehicle.

5. The method according to claim 1, wherein at least one of the first audio signal and the second audio signal comprises a signal associated with one of a phase current, a direct current (DC) bus current, a collector to emitter current of a transistor of the inverter, a drain to source current of a transistor of the inverter, and an inductor current of a DC/DC converter.

6. The method according to claim 1, wherein at least one of the first audio signal and the second audio signal comprises a signal associated with one of a phase voltage and a direct current bus voltage.

7. The method according to claim 1, wherein the outputting the combined signal comprises outputting, using at least one speaker, an audio signal corresponding to the amplified combined signal.

8. The method according to claim 1, wherein the outputting the combined signal comprises outputting, using a display, a visual representation of the combined signal.

9. A sound synthesis system comprising:
an input configured to receive a dynamic inverter signal from an inverter coupled between a battery and a direct current electric machine of a vehicle, wherein the dynamic inverter signal is dependent on at least one of a parameter of the inverter and an operation of the inverter;
a synthesizer operatively connected to the input and configured to synthesize a first audio signal based on the dynamic inverter signal;
a combination module operatively connected to the synthesizer and configured to generate a combined signal based on the first audio signal and a second audio signal using at least one of a combination function, a superimposition function, a mixing function, a multiplication function, and an adding function;
an audio amplifier operatively connected to the combination module and configured to generate an amplified combined signal by amplifying the combined signal;
an output module configured to output the amplified combined signal; and
a temperature sensor disposed within the vehicle, wherein at least one of the first audio signal and the second audio is based on an output of the temperature sensor, and wherein the temperature sensor is configured to measure a temperature of at least one of:
an alternating current bus bar of the inverter, a direct current bus bar of the inverter, a printed circuit board of the inverter, a location along a coolant path of the vehicle, an insulated gate bipolar transistor (IGBT) of the inverter, a metal-oxide semiconductor field-effect transistor (MOSFET) of the inverter, and one or more end windings of an electric motor of the vehicle.

10. The system according to claim 9, wherein at least one of the first audio signal and the second audio signal comprises a signal associated with a motor control parameter.

11. The system according to claim 10, wherein the motor control parameter represents at least one of: a current command, a torque command, a voltage command, a feedback of current, a feedback of voltage, a measurement of torque, a selected pulse width modulation (PWM) strategy, a PWM frequency, a PWM duty cycle, an electric machine parameter of flux linkage, and an electric machine parameter of inductance.

12. The system according to claim 10, wherein at least one of the first audio signal and the second audio signal comprises a signal associated with a current sensor within the vehicle.

13. The system according to claim 10, wherein at least one of the first audio signal and the second audio signal comprises a signal associated with one of a phase current, a direct current (DC) bus current, a collector to emitter current of a transistor of the inverter, a drain to source current of a transistor of the inverter, and an inductor current of a DC/DC converter.

14. The system according to claim 10, wherein at least one of the first audio signal and the second audio signal comprises a signal associated with one of a phase voltage and a direct current bus voltage.

15. The system according to claim 9, wherein the output module comprises a speaker configured to output an audio signal corresponding to the amplified combined signal.

16. The system according to claim 9 wherein the output module comprises a display configured to output a visual representation of the amplified combined signal.

* * * * *